UNITED STATES PATENT OFFICE.

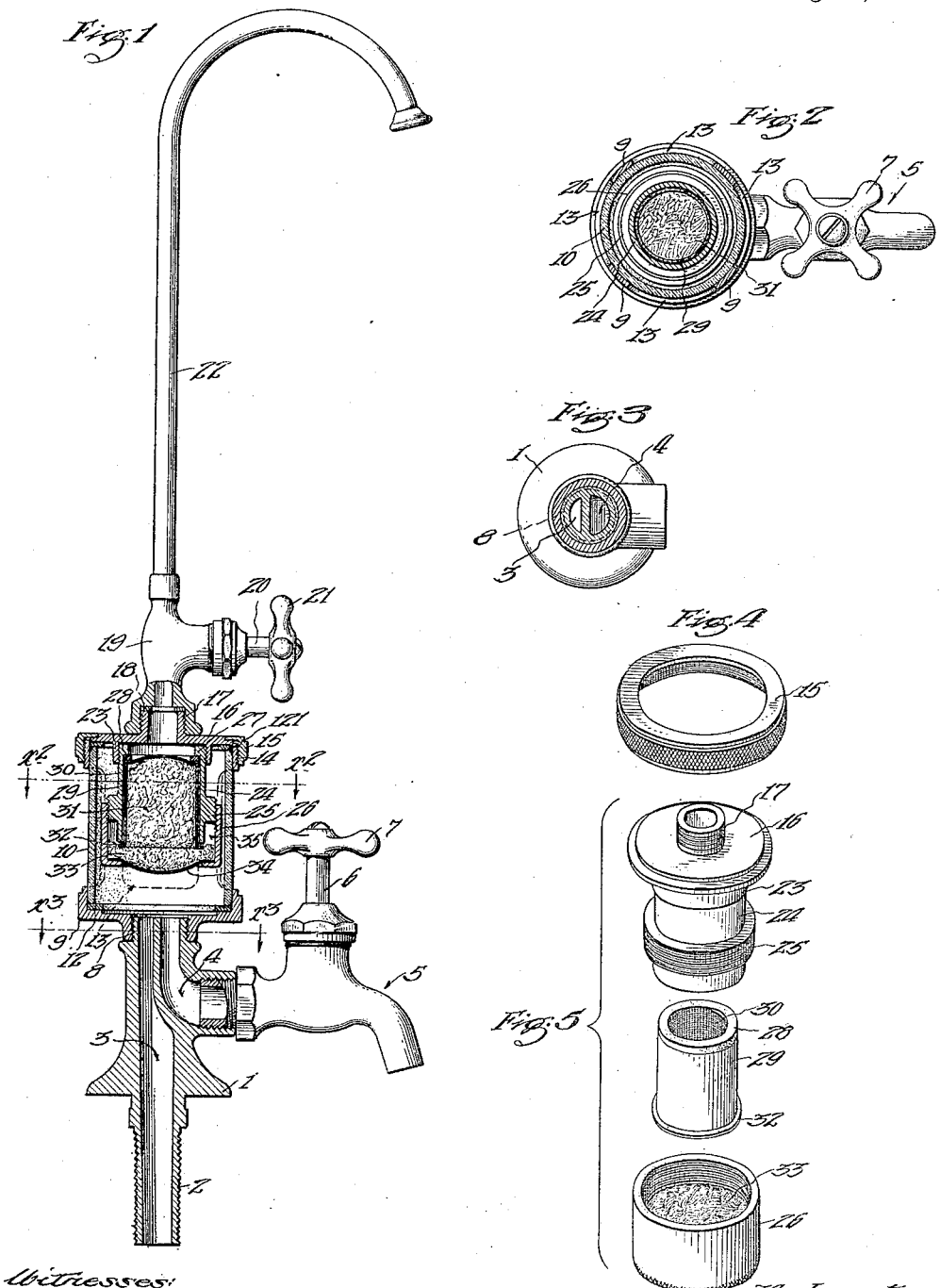

CHARLES STUART FACKENTHALL, OF PACIFIC GROVE, CALIFORNIA.

FILTER.

1,106,641.     Specification of Letters Patent.     Patented Aug. 11, 1914.

Application filed July 15, 1913. Serial No. 779,221.

*To all whom it may concern:*

Be it known that I, CHARLES STUART FACKENTHALL, a citizen of the United States, residing at Pacific Grove, in the county of Monterey, State of California, have invented a new and useful Filter, of which the following is a specification.

My invention relates to improvements in filters such as are commonly employed in removing impurities from water, wine and other liquids.

The objects of my improvements are: First, to provide a filter of this class which is adapted to remove impurities from the liquid passing through it and which is provided with means whereby these impurities may be carried off after being removed from the liquid by the filter; second, to provide a device of this character which may be readily taken apart for inspection or renewal of the filtering element; third, to provide such a filter in a form that will be ornamental and more efficient than previous devices of this character; fourth, to provide a filter that can be readily adjusted to meet varying degrees of pressure; and fifth, to provide a filter that can be readily adapted to meet the requirements of fluids of varying degrees of density.

Further objects and advantages will appear hereinafter.

Referring to the drawings which are for illustrative purposes only: Figure 1 is an elevation of my invention, portions thereof being shown in section. Fig. 2 is a sectional plan view on the lines $x^2$—$x^2$ of Fig. 1 looking in the direction of the arrows. Fig. 3 is a sectional plan view on the lines $x^3$—$x^3$ of Fig. 1 looking in the direction of the arrows. Fig. 4 is a perspective view of one member of the filter. Fig. 5 is a perspective view of other members of the filter shown in a disassembled position.

In the embodiment of my invention illustrated in these drawings, 1 is a body member provided with a thread 2, at the lower end thereof for attachment to the supply pipe not shown which furnishes the liquid to be filtered. This body member 1 has an inlet opening 3 extending longitudinally therethrough, and an outlet opening 4 extending downwardly therethrough as illustrated in Fig. 1. 5 is a bib of any of the well known forms provided with a valve stem 6, operated by a handle 7, the stem 6 extending downwardly into the body of the bib and actuating the valve therein, whereby the supply of liquid may be controlled. The upper portion of the body 1 is provided with a thread 8 upon which is carried a frame 9, this frame being provided with a glass cylinder 10, which seats upon a washer 12, the frame being cut away as shown at 13, so that the external surface of the glass 10 is exposed. The upper portion of the frame 9 is provided with a thread 14 upon which is fastened a clamping nut 15, this nut being used for the purpose of securely seating a top 16 against a washer 121 which seats upon the glass 10. The top 16 is provided with a threaded nipple 17 and a washer 18 upon which a valve body 19 is secured and seats. This valve body 19 is provided with a valve stem 20 and a handle 21, the valve stem 20 extending into the body member 19, and actuating a valve therein so that the flow of liquid in a goose neck 22 may be controlled. Extending downwardly from the top 16 is a flange 23 into which is threaded a cylinder 24, this cylinder being provided with an enlarged portion 25 intermediate of its length upon which is threaded a clamping ring 26. The cylinder 24 has a recess therein, the upper portion of which recess is provided with a shoulder 27, upon which is seated a washer 28. A metal cartridge, consisting of a shell 29 and a wire gauze member 30 crimped therein, is filled with a filtering material 31. The lower edge of the cartridge 29 is crimped back to form a shoulder 32, as shown in Fig. 1 and Fig. 5. The lower portion of the clamping ring 26 is filled with a body of filtering material 33, which is retained in place by a wire gauze member 34. The filtering material 33 is forced against the flanges 32 of the cartridge 29 and the upper edge of the cartridge 29 is forced against the washer 28, which is seated on the shoulder 27, this forcing action being accomplished by setting up upon the clamping ring 26. An annular space 35 is thus provided between the cylinder 24 and the clamping ring 26, as shown in Fig. 1.

The method of operation of my invention is as follows: The liquid to be filtered is admitted into the lower portion of the glass 10 through the opening 3. This liquid may be drawn off through the filtering material 31 and 33 and through the goose neck 22, by opening the valve therein by means of handle 21 and valve stem 20. The liquid in passing through the filtering material has any solid impurities, which may be contained therein, separated therefrom, and emerges from the goose neck 22 in a filtered condition. The bib 5 is provided for drawing off unfiltered water, the unfiltered water being admitted through the opening 3, and withdrawn through opening 4. The stream of unfiltered water when forced upwardly through the opening 3 impinges upon the filtering material and washes off the impurities deposited on the surface thereof. These impurities are carried away in the stream of unfiltered water which flows through the bib 5.

In filters in which a body of filtering material, such as felt, is clamped inside a metal container or cartridge, it is extremely difficult to prevent a seepage of unfiltered fluid along the surface of the containing member between it and the body of filtering material. This seepage tends to force the filtering material away from the wall of the cartridge and to let unfiltered fluid through. One of the objects of my invention is to prevent this flow of unfiltered fluid between the body of filtering material and the metal surface of the cartridge in which it is inclosed. It will be noted that I have provided a metal cartridge, consisting of a shell 29, and that this cartridge is packed with a filtering material 31. It will also be noted that the ends of this cartridge are turned up at 32 and that they are pressed firmly against the body of filtering material 33, which is carried in the clamping ring 26. This tends to prevent the seepage mentioned between the filtering material 31 and the shell 29. The chamber 35 plays an important part in the operation of this filter. Once this chamber is filled with the liquid being filtered, there is no further movement in the confined liquid, hence no further intrusion of unfiltered fluid, and consequently no possible leakage of unfiltered liquid into the filtering media or between the filtering media and the metal. Because of this trap the fluid passing through the filter deposits upon the lower surface of the filter all rejected solids, and the solids so deposited are acted upon and moved by a jet of water directed against the underside of this filtering material through the opening 3.

The filter as illustrated is particularly adapted for filtering water, the filtering material used in this case being preferably felt and a fine granular substance. A filter of this same construction can be used for filtering wine and other liquids by omitting the body of filtering material 31 and depending upon the filtering material 33 entirely. It is obvious that felt, chamois or other material may be used in this connection. While the filter as illustrated is commonly made of metal, it is advisable in the case of certain liquids to use a non-metallic material in the construction of such a filter. In such a case I find it advisable to construct the various parts of glass in combination with certain celluloid or hard rubber. This is particularly necessary in wine filters. I have constructed filters of this character which were wholly non-metallic.

I claim as my invention:

1. A filter comprising an inclosing shell having a central enlargement thereon, a body of filtering material inside said shell, a clamping nut threaded to said central enlargement on said shell so as to leave an annular space between the inner surface of said nut and a portion of the shell, and a body of filtering material carried in said clamping nut and tightly secured against the end of said shell by said nut.

2. A filtering element comprising a hollow cylinder having a threaded central enlargement, a shell adapted to fit into said cylinder and having a foraminous upper end, a body of filtering material in said shell, a clamping ring threaded to engage the said central enlargement, a foraminous member in the lower end thereof, and a second body of filtering material clamped between the end of said shell and said foraminous member, an annular dead space being formed between said coupling, said cylinder and said second body of filtering material.

3. In a filter a filtering element composed of an inclosing shell having a central enlargement thereon, filtering material in said shell, a clamping member, and a body of filtering material in said clamping member, said clamping member being so shaped and attached to said central enlargement as to form an annular recess about said shell between said central enlargement and said body of filtering material.

In testimony whereof, I have hereunto set my hand at Monterey, California, this 8th day of July, 1913.

CHARLES STUART FACKENTHALL.

In presence of—
FRANKLIN W. VARIEN,
ERNEST MICHAELIS.

Copies of this patent may be obtained for five cents each, by addressing the "Commissioner of Patents, Washington, D. C."